(12) United States Patent
Schach et al.

(10) Patent No.: US 7,126,564 B2
(45) Date of Patent: Oct. 24, 2006

(54) ILLUMINATION AND DISPLAY DEVICE

(75) Inventors: Harald Schach, Flacht (DE); Georg Ewald, Weissach (DE)

(73) Assignee: Robert Bosch GmbH, Stuttgart (DE)

(*) Notice: Subject to any disclaimer, the term of this patent is extended or adjusted under 35 U.S.C. 154(b) by 402 days.

(21) Appl. No.: 10/030,638

(22) PCT Filed: Apr. 27, 2001

(86) PCT No.: PCT/DE01/01591

§ 371 (c)(1),
(2), (4) Date: May 17, 2002

(87) PCT Pub. No.: WO01/83255

PCT Pub. Date: Nov. 8, 2001

(65) Prior Publication Data

US 2002/0149495 A1  Oct. 17, 2002

(30) Foreign Application Priority Data

May 2, 2000  (DE) ................. 100 21 099

(51) Int. Cl.
G09G 3/20 (2006.01)
G09G 3/22 (2006.01)
G01D 11/28 (2006.01)

(52) U.S. Cl. .................. 345/75.1; 362/27; 116/288

(58) Field of Classification Search ............ 345/75.1; 340/815.78, 461; 349/1; 362/27, 26, 23; 116/284–288, 300
See application file for complete search history.

(56) References Cited

U.S. PATENT DOCUMENTS 5,050,045 A * 9/1991 Kato et al. ............... 362/23
5,703,612 A * 12/1997 Salmon et al. .......... 340/815.78
5,741,058 A * 4/1998 Suzuki et al. ............. 362/27
5,815,072 A * 9/1998 Yamanaka et al. ........ 340/461
5,964,515 A * 10/1999 Ikeuchi et al. ............ 362/26
6,025,820 A * 2/2000 Salmon et al. ........... 345/75.1
6,267,072 B1   7/2001 Seto et al.
6,296,990 B1  10/2001 Kwan
6,302,551 B1 * 10/2001 Matumoto ................ 362/27
6,379,015 B1   4/2002 Wilhelm et al.
6,404,463 B1 * 6/2002 Knoll et al. ............... 349/1

FOREIGN PATENT DOCUMENTS

| CD | 26 55 818 | 6/1978 |
|---|---|---|
| DE | 44 01 231 | 7/1995 |
| DE | 195 41 875 | 5/1996 |
| DE | 195 47 375 | 6/1997 |
| DE | 196 01 270 | 7/1997 |
| DE | 196 06 245 | 8/1997 |
| DE | 196 32 381 | 2/1998 |
| DE | 197 05 452 | 8/1998 |
| DE | 197 02 957 | 1/1999 |
| DE | 199 04 597 | 10/1999 |
| DE | 198 44 316 | 3/2000 |
| EP | 1 055 916 | 11/2000 |

* cited by examiner

Primary Examiner—Sumati Lefkowitz
Assistant Examiner—Srilakshmi K Kumar
(74) Attorney, Agent, or Firm—Kenyon & Kenyon LLP

(57) ABSTRACT

An illumination device for a display instrument is described which is used to illuminate two sets of scale markings and to separately illuminate a pointer scale of the display instrument. The light from a light source is guided past light funnels that are used to illuminate the pointer scale by an optical waveguide. This provides an efficient and economical means of illuminating a display instrument of this type.

16 Claims, 2 Drawing Sheets

ILLUMINATION AND DISPLAY DEVICE

BACKGROUND INFORMATION

The present invention relates to an illumination device for a display instrument according to the definition of the species of the main claim. Illumination devices for display instruments with two different scale markings are known in which both the scale markings as well as a pointer scale are illuminated by one light source. If individual segments of the pointer scale are to be darkened, a known method is for this darkening to be implemented using a switchable liquid crystal cell. The liquid crystal cell is, however, expensive to manufacture and difficult to mount, especially since it is generally made of glass. A further known method is to arrange additional light sources to illuminate each pointer scale.

ADVANTAGES OF THE INVENTION

In contrast, the illumination device according to the present invention having the features of the main claim has the advantage that a first scale marking can be illuminated by a first light source and a second scale marking can be illuminated by an optical waveguide using light guidance separately from the pointer scale. The light path from the first light source to the scale markings is separated from an illumination of the pointer scale by light funnels, making undisturbed illumination of the pointer scale or of parts of the pointer scale possible, so that parts of the pointer scale can also be switched or illuminated with a different color than that of the scale marking. Therefore, a second light source for the second scale marking can be eliminated.

The measures detailed in the subclaims make advantageous refinements and improvements of the illumination device specified in the main claim possible. It is of particular advantage to arrange the light sources as well as the light funnel on a circuit board since this makes it possible to supply the light sources with an operating voltage in a simple manner without additional wire connections.

Moreover, it is advantageous to illuminate the pointer scale by a plurality of light sources so that individual segments of the pointer scale can be illuminated separately. For this purpose, the individual light sources can preferably be electrically activated separately.

Furthermore, it is advantageous to produce the light funnel from a reflective material to ensure that illumination of the pointer scale is as homogeneous and efficient as possible. In this regard, it is of particular advantage to integrate the individual light funnels in one component, which is preferably produced by injection molding of a plastic material. This component is easy to mount and can be used to affix the optical waveguide at the same time.

Furthermore, it is advantageous to use the illumination device in a display instrument and for better homogenization to arrange a diffusing screen between the illumination device and a dial face in order to attain a brightness distribution that is as homogeneous as possible, in particular of the light from the first light source.

Furthermore, it is advantageous to implement a cruise control display in a vehicle with the illumination device according to the present invention or the display device according to the present invention in which, in addition to an instantaneous vehicle speed displayed by a pointer, a target speed specified by a driver is shown in a display by partial illumination of the pointer scale or by a color change of the pointer scale. As a result, the user obtains information concerning the instantaneous vehicle speed as well as a set target speed in one glance at the display instrument.

DRAWING

DESCRIPTION OF THE EXEMPLARY EMBODIMENT

Figure 1:
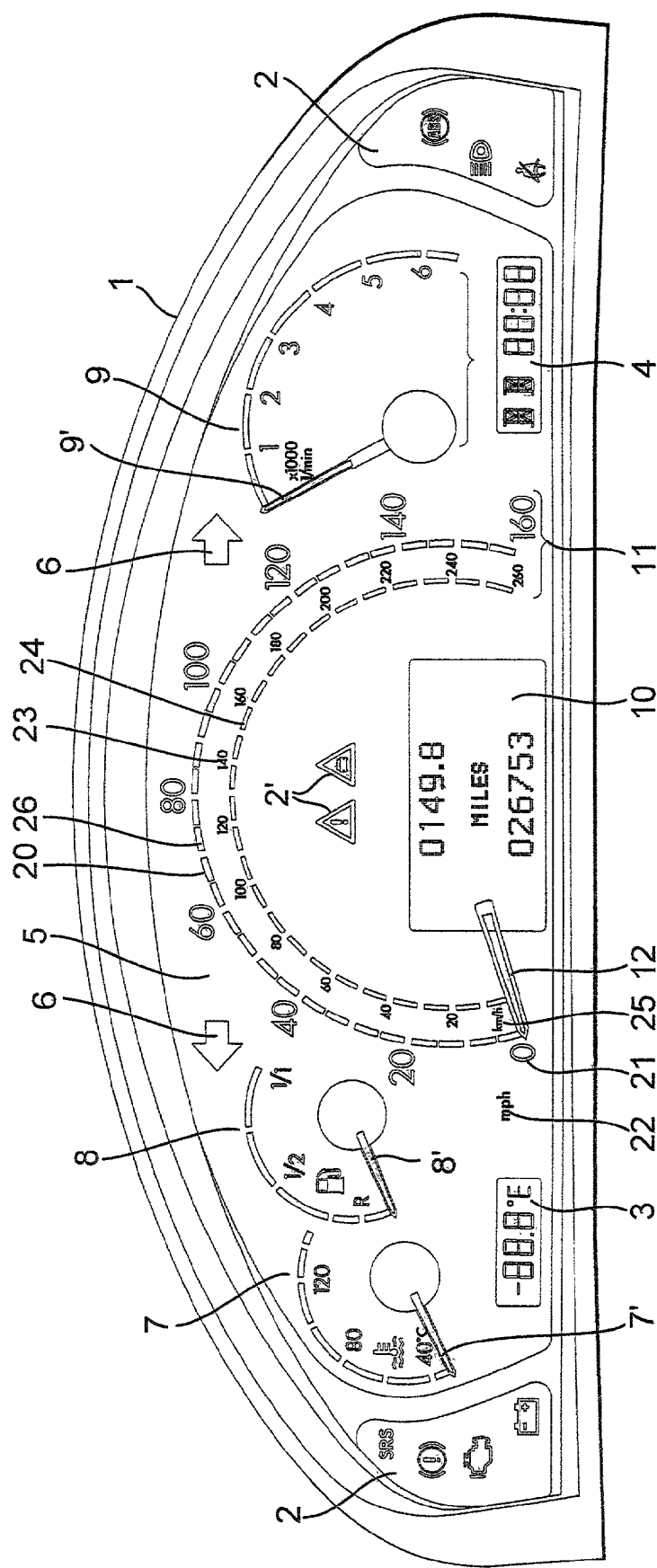
FIG. 1 shows an instrument cluster with a display instrument according to the present invention.

The illumination device according to the present invention can be used in various display instruments having at least one pointer scale and two markings of such a pointer scale, e.g., with various physical units or with various directly determinable variables, e.g. for general use in measuring instruments. The present invention is explained on the basis of its use for a display instrument in a motor vehicle. FIG. 1 shows an instrument cluster 1 having a plurality of displays which is arranged in front of a driver in a motor vehicle and which informs the driver concerning important vehicle parameters. Arranged to the right and left sides of instrument cluster 1 are warning fields 2 that can be illuminated individually and serve to warn a driver of, e.g., a defect in the vehicle. Moreover, a temperature display 3 and a time display 4 are arranged in instrument cluster 1 on which the exterior temperature and the time are shown by a liquid crystal display. Displays for a turn signal indicator 6 are provided on a dial face 5 and are preferably illuminated via light-emitting diodes. In addition, a coolant temperature gauge 7, a fuel gauge 8 and a tachometer 9 are arranged on dial face 5, pointers 7', 8', and 9', respectively, serving to indicate the particular measured variable in front of a pointer scale. An odometer 10 is arranged in the center of dial face 5, additional warning fields 2' being arranged adjacent to the odometer. Odometer 10 is surrounded by a speedometer 11 in the shape of a semicircle, the instantaneous speed of the vehicle being shown by a position of a pointer 12 over a pointer scale 20. Pointer scale 20 has a first scale marking 21 with values from "0" to "160" in intervals of 20 each, which are characterized by a units designation 22 as "mph" miles per hour. In addition, speedometer 11 has a second scale marking 23 with an auxiliary scale 24. In second scale marking 23, the values range from "20" to "260" in increments of twenty and are characterized by a second units designation 25 as "km/h" kilometers per hour. Pointer scale 20 is used to display a target speed. Pointer scale 20 is made up of individual segments 26, each of which can be illuminated individually. An illumination device according to the present invention extends behind speedometer 11 so that first scale marking 21 and second scale marking 23 can be illuminated together with auxiliary scale 24 while segments 26 of pointer scale 20 are separate from this and can be illuminated individually in segments. While pointer 12 displays an instantaneous vehicle speed, the illumination of segments 26 of pointer scale 20 displays a target speed of the vehicle (a cruise control speed). In a first embodiment, scale segments 26 are illuminated to the desired speed, e.g., 80 mph, while all scale segments above this target speed remain darkened or are only illuminated very weakly. In further embodiments, a change of color of the illumination, e.g., green up to a target speed and red above this target speed, or also by the illumination or darkening of only one scale segment at the point of the target speed makes it possible to display the target speed with pointer scale 20. Except for apertures, dial face 5 is designed to be impervious to light, the apertures forming pointer scales and scale markings for pointer gauges 7, 8, 9 and for speedometer 11. Neither an arithmetic unit to control the cruise control function nor a control unit for the driver to enter the desired speed is shown in FIG. 1. In a further embodiment not shown in FIG. 1, a second scale marking 23 is omitted and instead only auxiliary scale 24 is arranged on the side of the pointer scale facing away from first scale marking 21 to provide an orientation concerning the dimensions of the entire pointer scale. Similarly, starting with the embodiment described with reference to FIG. 1, it is possible to omit the arrangement of auxiliary scale 24.

Figure 2:
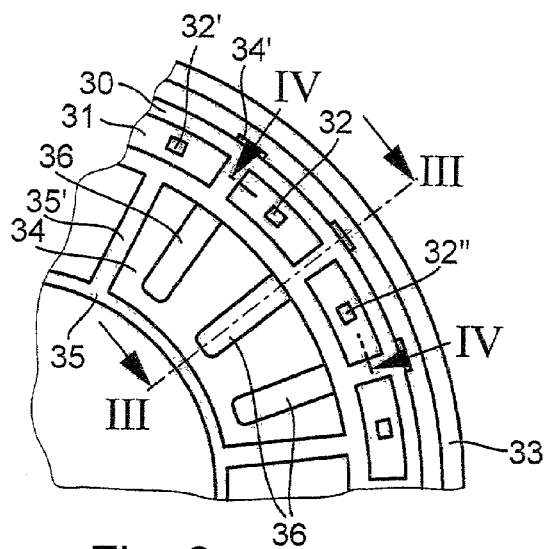
FIG. 2 shows a first top view of an illumination device designed according to the invention in a display instrument.

FIG. 2 shows a top view from the position of the dial face to an illumination device according to the present invention in an area of speedometer 11 which is located behind the dial face. In an area beneath pointer scale 20, homogeneous light funnels 31, 31', and 31" have been placed in a support 30, a homogeneous light source 32, 32', 32" being arranged at the bottom of each light funnel. The size of light funnels 31, 31', 31" corresponds roughly to segments 26, 26', 26" with the result that one segment 26 of pointer scale 20 according to FIG. 1 is illuminated via each light funnel 31, 31', 31" with the associated light source 32, 32', 32". Support 30 follows a circular form of speedometer 11. A first light source 33 is arranged outside the circle described by support 30. First light source 33, which is preferably in the form of a cold cathode fluorescent tube, runs below scale marking 21 according to the embodiment of FIG. 1. An optical waveguide 34 adjoins the inside of the circle described by support 30, across which retaining structures 35, 35' extend, the retaining structures being molded onto support 30 and representing an extension of support 30. Optical waveguide 34 has output surfaces 36 that are used to output the light that is injected from first light source 33 into optical waveguide 34 and output in the direction of second scale marking 23 or auxiliary scale 24. In a preferred embodiment, output surfaces 36 run roughly parallel to the surface of dial face 5. In a further embodiment, output surfaces 36 are provided with a diffusion imprint or microprisms to ensure an efficient output at output surfaces 36. Optical waveguide 34 is made of a transparent plastic material, preferably polycarbonate. In addition, the optical waveguide may be made of a light scattering material. Support 31 is preferably made of a reflective plastic material, preferably polycarbonate stained with titanium dioxide to deflect the light emitted from second light source 32 into light funnel 31 and also to deflect the light output from optical waveguide 34 in the direction of dial face 5. In an area 34' on the side of support 30 facing first light source 33, optical waveguide 34 protrudes over the side of support 30, an output surface 36 being opposite area 34' on the side of support 30 opposite area 34'.

Figure 3:
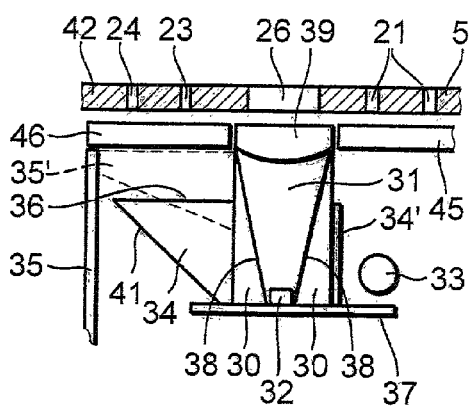
FIG. 3 shows the illumination device according to the present invention of FIG. 2 in a section along line III.

FIG. 3 shows a longitudinal section through the illumination device shown in FIG. 2 along line III in FIG. 2. Second light source 32 is arranged on a circuit board 37, via which first light source 33 is supplied with an operating voltage. Conductor paths arranged for this purpose on circuit board 37 are not shown in FIG. 3. Light source 32 beams light into light funnel 31, which is delimited by reflective walls 38 of support 30. In a preferred embodiment, a lens 39 is arranged on the side of light funnel 31 facing away from light source 32, the lens bundling the light emitted from second light source 32 in the direction of a segment 26 of pointer scale 20 in dial face 5, dial face 5 being supported on lens 39, on a first diffusing screen 45 and on a second diffusing screen 46. First diffusing screen 45 homogenizes the light emitted from first light source 33 immediately in the direction of dial face 5. Second diffusing screen 46 homogenizes the light emitted from optical waveguide 34 or output surfaces 36 in the direction of dial face 5. In a preferred embodiment, both first diffusing screen 45 and second diffusing screen 46 are supported on support 30. In FIG. 3, a dashed line represents a retaining structure 35' which holds optical waveguide 34 against circuit board 37. In dial face 5, light-impervious areas 42 are recognizable adjacent to segment 26, the light-impervious areas being interrupted by apertures for first scale marking 21 and for second scale marking 23 as well as for auxiliary scale 24. The light emitted from first light source 33 is homogenized by first diffusing screen 45 and backlights first scale marking 21 in dial face 5. In addition, light radiates from first light source 33 into optical waveguide 34 through area 34' of the optical waveguide and is deflected by output surfaces 36 in the direction of second diffusing screen 46 or second scale marking 23 and auxiliary scale 24. In a preferred embodiment, optical waveguide 34 has a reflective surface 41 which is arranged on a side of optical waveguide 34 facing away from output surfaces 36 and totally reflects the light beamed into optical waveguide 34 to second scale marking 23.

Figure 4:
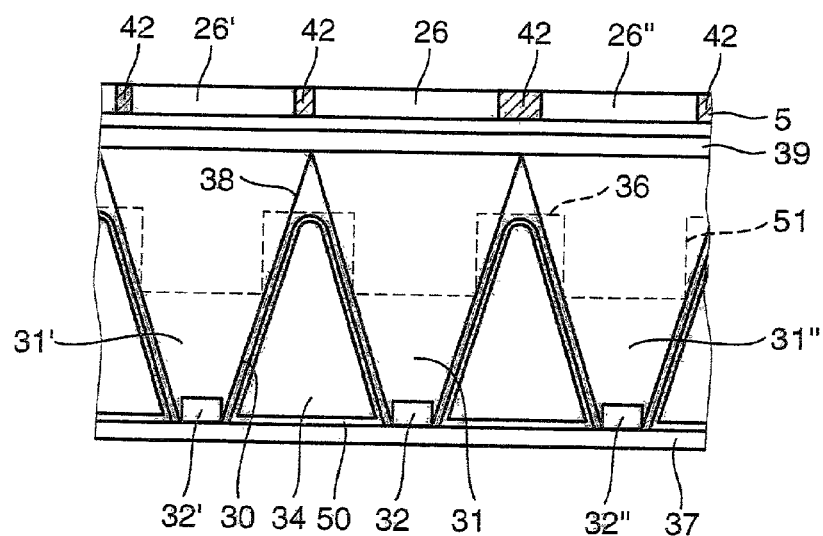
FIG. 4 shows the illumination device according to the present invention according to FIG. 2 in a longitudinal section according to line IV.

FIG. 4 shows a longitudinal section through the display device according to the present invention according to line IV of FIG. 2. In FIG. 4, a segment 26 is assigned to a second light source 32, a segment 26' is assigned to a second light source 32' and a segment 26" is assigned to a second light source 32". The illumination of individual segments 26, 26', 26" is homogeneous. Light funnel 31 proceeds in the shape of a funnel starting from circuit board 37 or second light source 32 and opens in the direction of dial face 5. An aperture 50 for optical waveguide 34 is placed in support 30 between a light funnel 31 to second light source 32 and a light funnel 31' to second light source 32', the light from first light source 33, which is not shown in FIG. 4, being injected through the optical waveguide in the direction of second scale marking 23 or auxiliary scale 24. Optical waveguide 34 is optically separated from second light source 32 by the walls of light funnel 31, which are not transparent. A dashed line 51 shows the progress of optical waveguide 34 on the side facing away from support 30 according to the view in FIG. 4. As soon as optical waveguide 34 has crossed support 30, optical waveguide 34 widens on a side facing dial face 5 and forms output surfaces 36. In the embodiment shown here, light-emitting diodes are used for second light sources 32. However, it is also possible to use other light sources such as incandescent lamps or glow lamps. Since individual segments 26, 26', 26" of pointer scale 20 are separated by light-impervious areas 42 of dial face 5, separate illumination of each scale segment is possible through the associated second light source 32, 32', 32".

What is claimed is:

1. An illumination device for a display instrument, comprising:
    a dial face;
    a pointer scale arranged on the dial face;
    a first scale marking of the pointer scale arranged on a first side of the pointer scale on the dial face;
    at least one of a second scale marking of the pointer scale and an auxiliary scale arranged on a second side of the pointer scale on the dial face;
    a first light source for illuminating the first scale marking;

an optical waveguide into which a light of the first light source is injected, the light being deflected from the optical waveguide to the second scale marking;

at least one second light source for illuminating the pointer scale; and a light funnel arranged between the at least one second light source and the pointer scale, wherein:
  a light path from the at least one second light source to the pointer scale is separated from the optical waveguide by the light funnel.

2. The illumination device according to claim 1, further comprising:

a circuit board on which is arranged the at least one second light source.

3. The illumination device according to claim 1, further comprising:

at least one second light funnel, wherein:
  the at least one second light source includes a plurality of other light sources,
  the pointer scale is illuminated by the plurality of other light sources,
  each of the plurality of other light sources is arranged in a respective one of the light funnel and the at least one second light funnel, and
  the optical waveguide proceeds between at least two of the light funnel and the at least one second light funnel from the first light source to the at least one of the second scale marking and the auxiliary scale.

4. The illumination device according to claim 3, wherein:
the pointer scale includes a plurality of scale segments,
at least one of the plurality of other light sources is assigned to one of the plurality of scale segments, and
the plurality of other light sources are able to be electrically activated individually and one of a brightness and a color of the plurality of other light sources is changeable.

5. The illumination device according to claim 4, wherein:
the plurality of other light sources include a plurality of light-emitting diodes.

6. The illumination device according to claim 4, wherein:
the plurality of other light sources includes a plurality of incandescent lamps.

7. The illumination device according to claim 4, wherein:
the plurality of other light sources includes a plurality of glow lamps.

8. The illumination device according to claim 3, further comprising:
a circuit board; and
a support in which the light funnel and the at least one second light funnel are interconnected, wherein:
  the optical waveguide is held against the circuit board by the support.

9. The illumination device according to claim 1, wherein:
the light funnel includes a reflective material.

10. The illumination device according to claim 5, wherein:
the reflective material includes a white plastic material.

11. The illumination device according to claim 1, wherein:
the pointer scale is configured to display a target speed.

12. The illumination device according to claim 11, wherein:

the first scale marking is configured in units of miles per hour and the second scale marking is configured in kilometers per hour.

13. The illumination device according to claim 1, wherein the pointer scale includes a plurality of individually-illuminated segments.

14. A display instrument, comprising:
an illumination device that includes:
  a dial face,
  a pointer scale arranged on the dial face,
  a first scale marking of the pointer scale arranged on a first side of the pointer scale on the dial face,
  at least one of a second scale marking of the pointer scale and an auxiliary scale arranged on a second side of the pointer scale on the dial face,
  a first light source for illuminating the first scale marking,
  an optical waveguide into which a light of the first light source is injected, the light being deflected from the optical waveguide to the second scale marking,
  at least one second light source for illuminating the pointer scale, and
  a light funnel arranged between the at least one second light source and the pointer scale, wherein:
    a light path from the at least one second light source to the pointer scale is separated from the optical waveguide by the light funnel.

15. The display instrument according to claim 14, further comprising:
a diffusing screen arranged between the dial face and the first light source.

16. A cruise control display in a vehicle, comprising:
a processing unit; and
a display instrument including an illumination device that includes:
  a dial face,
  a pointer scale arranged on the dial face,
  a first scale marking of the pointer scale arranged on a first side of the pointer scale on the dial face,
  at least one of a second scale marking of the pointer scale and an auxiliary scale arranged on a second side of the pointer scale on the dial face,
  a first light source for illuminating the first scale marking,
  an optical waveguide into which a light of the first light source is injected, the light being deflected from the optical waveguide to the second scale marking,
  at least one second light source for illuminating the pointer scale, and
  a light funnel arranged between the at least one second light source and the pointer scale, wherein:
    a light path from the at least one second light source to the pointer scale is separated from the optical waveguide by the light funnel,
    an actual vehicle speed is displayed by the cruise control display by a pointer, and
    a desired speed is displayed by the cruise control display by illuminating segments of the pointer scale of the display instrument.

* * * * *